United States Patent
Borla et al.

(10) Patent No.: US 9,174,143 B1
(45) Date of Patent: Nov. 3, 2015

(54) RECOVERY OF WATER FROM EXHAUST GAS

(71) Applicants: Alexander Borla, Johnson City, TN (US); Peter Hofbauer, West Bloomfield, MI (US)

(72) Inventors: Alexander Borla, Johnson City, TN (US); Peter Hofbauer, West Bloomfield, MI (US)

( * ) Notice: Subject to any disclaimer, the term of this patent is extended or adjusted under 35 U.S.C. 154(b) by 108 days.

(21) Appl. No.: 14/156,954

(22) Filed: Jan. 16, 2014

Related U.S. Application Data

(60) Provisional application No. 61/754,673, filed on Jan. 21, 2013.

(51) Int. Cl.
*B01D 53/00* (2006.01)
*B01D 5/00* (2006.01)

(52) U.S. Cl.
CPC .................................. *B01D 5/0003* (2013.01)

(58) Field of Classification Search
CPC .. B01D 5/0003; B01D 5/0006; B01D 53/002; B01D 53/265
USPC ................. 261/154, 157, 158, 159, 160, 161, 261/DIG. 10
See application file for complete search history.

(56) References Cited

U.S. PATENT DOCUMENTS

| | | | | |
|---|---|---|---|---|
| 5,715,696 | A * | 2/1998 | Salvagno et al. | 62/272 |
| 8,075,245 | B2 * | 12/2011 | Odle et al. | 415/1 |
| 2004/0244588 | A1 * | 12/2004 | Sauer | 95/290 |
| 2009/0293724 | A1 * | 12/2009 | Ivison | 95/288 |
| 2011/0056457 | A1 * | 3/2011 | Livshits et al. | 123/25 R |
| 2011/0083453 | A1 * | 4/2011 | Castanon Seoane | 62/93 |
| 2012/0186328 | A1 * | 7/2012 | Makino et al. | 73/23.3 |
| 2012/0240563 | A1 | 9/2012 | Judkins et al. | |
| 2013/0008196 | A1 * | 1/2013 | Poyet | 62/93 |
| 2013/0276632 | A1 * | 10/2013 | Judkins et al. | 95/273 |

* cited by examiner

*Primary Examiner* — Charles Bushey
(74) *Attorney, Agent, or Firm* — Luedeka Neely Group, PC

(57) ABSTRACT

A system for recovering water from exhaust gasses, including a chamber having a first section for diverting and cooling a portion of the exhaust gases, and a second section for removing drinking water from the cooled gases. The first section slows down the flow rate of the diverted portion of exhaust gases and includes spaced apart helical tubes through which is passed a cooling fluid. The second section includes spaced apart helical tubes having a fluid permeable sidewall for travel of water from the exhaust gasses into the interior of the tubes of the second section. The tubes of the second section are coated on the exterior thereof with a porous material that promotes migration of drinking water from the exterior to the interior of the tubes.

7 Claims, 2 Drawing Sheets

RECOVERY OF WATER FROM EXHAUST GAS

This application claims priority to U.S. Provisional Application No. 61/754,673 filed Jan. 21, 2013, and entitled RECOVERY OF WATER FROM EXHAUST GAS, incorporated herein by reference in its entirety.

FIELD

This disclosure relates to the field of recovering low acidic water from exhaust gases generated by the high temperature combustion of hydrocarbons, as by the operation of burners of heating or cooking systems or thermodynamic machines driven by high temperature combustion as gas turbines. More particularly, this disclosure relates to methods and for improving the yield of low acidic and low corrosive water from exhaust gases.

BACKGROUND

Improvement is desired in the recovery of low acidic and low corrosive water with drinking water from exhaust gases. The combustion of hydrocarbons generates steam and water. Also, injecting water for reducing the $NO_X$ emissions can contribute additional water to exhaust gases. The water, whether in liquid or steam form, is expelled through the exhaust system as waste. While in the exhaust system, steam and water combines with other chemicals, creating toxic caustic pollution. A condensate from such an exhaust gas is also very acidic and corrosive.

There have been a number of attempts to remove and reclaim water from exhaust gases. These attempts typically depend on condensation by using a heat exchanger, cooled externally or by refrigeration or both. Water is collected in condensing collectors and trapped for removal. But the condensate created by such heat exchangers is also very acidic and corrosive and cannot be used as drinking water or for cooling purposes, such as in a radiator for the combustion in machines, as the corrosive nature of the water will corrode the radiator.

Accordingly, there is a need for methods and apparatus that improves the removal of low acidic and low corrosive water from exhaust gases.

SUMMARY

The disclosure advantageously provides a system for recovering water from exhaust gasses.

In one aspect, the system includes an exhaust flow path configured for having exhaust gases flow therethrough at a first velocity and a first temperature; a valve within the exhaust flow path; and a chamber adjacent to the exhaust flow path providing a enclosed flow area in flow communication with the exhaust flow path. The valve is operable to divert a portion of the exhaust gases from exhaust flow path for travel into the chamber.

The chamber includes a first section into which the diverted exhaust gases expand and slow down to a second velocity that is slower than the first velocity. The first section includes cooling surfaces to reduce the temperature of the diverted exhaust gases to a temperature that is less than the first temperature.

The chamber includes a second section in flow communication with the first section for receiving flow of diverted and cooled exhaust gases from the first section. The second section includes a plurality of fluid permeable tubes having a porous external coating thereon for contacting the diverted and cooled exhaust gases. The diverted and cooled exhaust gases condense on the tubes to yield liquid water which travels to interior portions of the tubes for recovery to yield recovered water.

In another aspect, the system includes an exhaust flow path configured for having exhaust gases flow therethrough at a first velocity and a first temperature; a valve within the exhaust flow path; and a chamber adjacent to the exhaust flow path providing an enclosed flow area in flow communication with the exhaust flow path. The valve is operable to divert a portion of the exhaust gases from exhaust flow path for travel into the chamber.

The chamber includes a first section into which the diverted exhaust gases expand and slow down to a second velocity that is slower than the first velocity. The first section includes spaced apart helical cooling tubes through which is passed a cooling fluid to reduce the temperature of the diverted exhaust gases to a temperature that is less than the first temperature.

The chamber includes a second section in flow communication with the first section for receiving flow of diverted and cooled exhaust gases from the first section. The second section includes a plurality of tubes having a fluid permeable sidewall coated on the exterior thereof with a porous material that promotes migration of water from the exterior to the interior of the tubes thereon for contacting the diverted and cooled exhaust gases. The diverted and cooled exhaust gases condense on the tubes to yield liquid water which travels through the porous material to interior portions of the tubes for recovery to yield recovered potable water.

Systems according to the disclosure are configured to cooperate with an exhaust system and advantageously divert, slow down, and cool a portion of the exhaust gases, and to then remove water from such diverted and cooled gases to enhance the recovery of drinking water from exhaust gases as compared to conventional systems.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
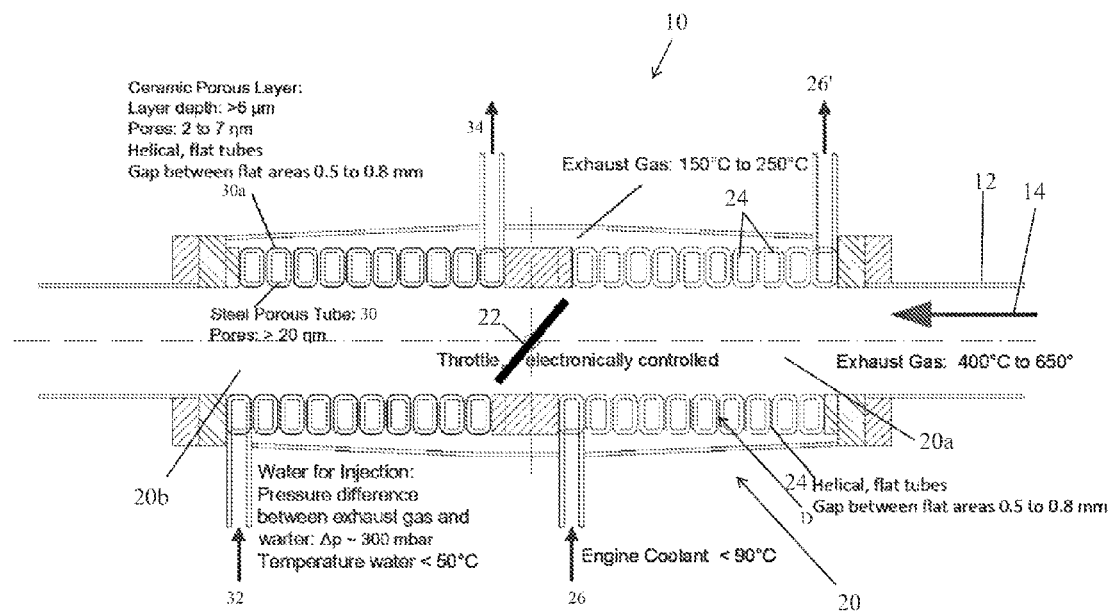
FIG. 1 shows features of a drinking water recovery system according to the disclosure.

With reference to FIG. 1, the disclosure relates to a system 10 for recovering drinking water from hot exhaust gases 12. As used herein, the terminology drinking water will be understood to mean potable water that may be consumed or used with low risk of immediate or long term harm. Such water is also suitable for use in a cooling system, such as a radiator.

The hot gases 12 may be gases generated by the high temperature combustion of hydrocarbons, such as by the operation of burners of heating or cooking systems or thermodynamic machines driven by high temperature combustion as gas turbines. Typically, the hot exhaust gases 12 have a temperature of from about 400 degrees C. to about 650 degrees C.

For example, the system 10 may be installed in an exhaust flow path 14 that directs the exhaust gasses 12 from a burner or an engine to recover water and thereby remove water from the exhaust gasses 12. The system 10 is configured to first divert, slow down, and cool a portion of the exhaust gases, and to then remove drinking water from such diverted and cooled gases.

The system 10 includes a chamber 20 providing an enclosed flow area in flow communication with the exhaust flow path 14. The chamber 20 is preferably segregated into first and second chamber sections 20a and 20b, respectively, by a controlled restrictor or valve 22. The chamber section 20a is configured for cooling the exhaust gasses 12 and contains a plurality of helical tubes 24. As indicated by arrow 26, coolant fluid (liquid or gas) is passed through the helical tubes 24 and exhaust gasses 12 in the first chamber section 20a are passed to the outside of the helical tubes 24, as a laminar flow with a high heat transfer coefficient, to condition and cool the this part of the exhaust of the flow path 14 to a temperature between 150° C. and 250° C.

The coolant fluid, as indicated by arrow 26', may then be routed for recovery, such as to a heat exchanger radiator, to cool the fluid for subsequent re-use. The thus cooled or conditioned exhaust gas then travels to the second chamber section 20b from the outside of helical tubes 30. Then, the conditioned exhaust gases are passed through the helical tubes 30 where a capillary distillation (with a molecular sieve) with a ceramic coating 30a takes place to recover drinking water from the exhaust gases.

The valve 22 is preferably automatically controlled as by an electronic controller to restrict or open the flow path 14. The flow path 14 is adjusted a desired amount based on predetermined criteria, and with consideration given to minimizing excessive backpressure. In this regard, the adjustment to the flow path 14 is made to desirably reduce the speed of the exhaust gases within the chamber 20, which controls the desired amount of drinking water from the exhaust gases. A series of sensors may be positioned at various locations within the system 10 to provide feedback to a computer controller. For example, various sensors may be provided for sensing various process conditions, such as temperature, flow, pressure, humidity, recovery tank water level, tube clogging, and the like.

The tubes 24 have impermeable sidewalls and may have a rectangular or other cross section and are desirably wound into a helical cylinder. The tubes 24 are spaced apart by a gap distance D selected to enhance cooling of the exhaust gases 12. The gap distance D is desirably selected to be from about 0.5 mm to about 0.8 mm to create a laminar flow with a high heat transfer coefficient, in the case of the tubes 24 being of rectangular cross section, with the gap distance D representing the distance between adjacent major sides. The cross sections of the tubes 24 are desirably optimized for increased surface area.

The second chamber section 20b has a plurality of permeable sidewall helical tubes 30, with each of the tubes 30 having a porous layer of coating 30a. The resulting drinking water is collected inside of tubes 30. The tubes 30 may be made of steel and include preferably uniformly spaced apertures or pores in the sidewalls thereof having a diameter of about 20 ηm for promoting the travel of water from the exterior of the tubes 30 into the interior of the tubes 30. The coating 30a is desirably a ceramic porous coating. The tubes 30 with the coating 30a are configured to stimulate capillary and osmotic action and function as a molecular sieve to draw condensed water inward into the interior of the tube 30.

A negative pressure and a lower temperature are desirably applied to the interior of the tubes 30 to further enhance recovery of drinking water. The negative pressure and reduction in temperature may be accomplished as by flowing fluid (liquid or gas) through the tubes 30, as indicated by arrow 32. For example, water having a temperature of less than 50° C. is flowed at a rate so as to yield a pressure difference in the interior of the tubes 30 of about 300 mbar lower than the pressure at the exterior of the tubes 30. The layer depth of the ceramic porous coating 30a is desirably thicker than 5 μm and the pores are desirably sized to have a diameter of from 2 to 7 ηm.

The tubes 30 are shaped and spaced apart similar to the tubes 24 to enhance surface area and improve yields. The tubes 30 are also preferably wound in a helical cylinder inside the chamber section 20b. Water collecting on the outer surfaces of the tubes 30 migrates to the interior of the tubes 30 by negative pressure, osmosis, and capillary action. Water accumulated on the interior of the tubes 30 flows toward a recovery tank, as indicated by arrow 34, for collection and removal.

Accordingly, the system 10 will be understood to advantageously divert, slow down, and cool a portion of the exhaust gases, and to then remove water from such diverted and cooled gases to enhance the recovery of drinking water from exhaust gases as compared to conventional systems.

Figure 2:
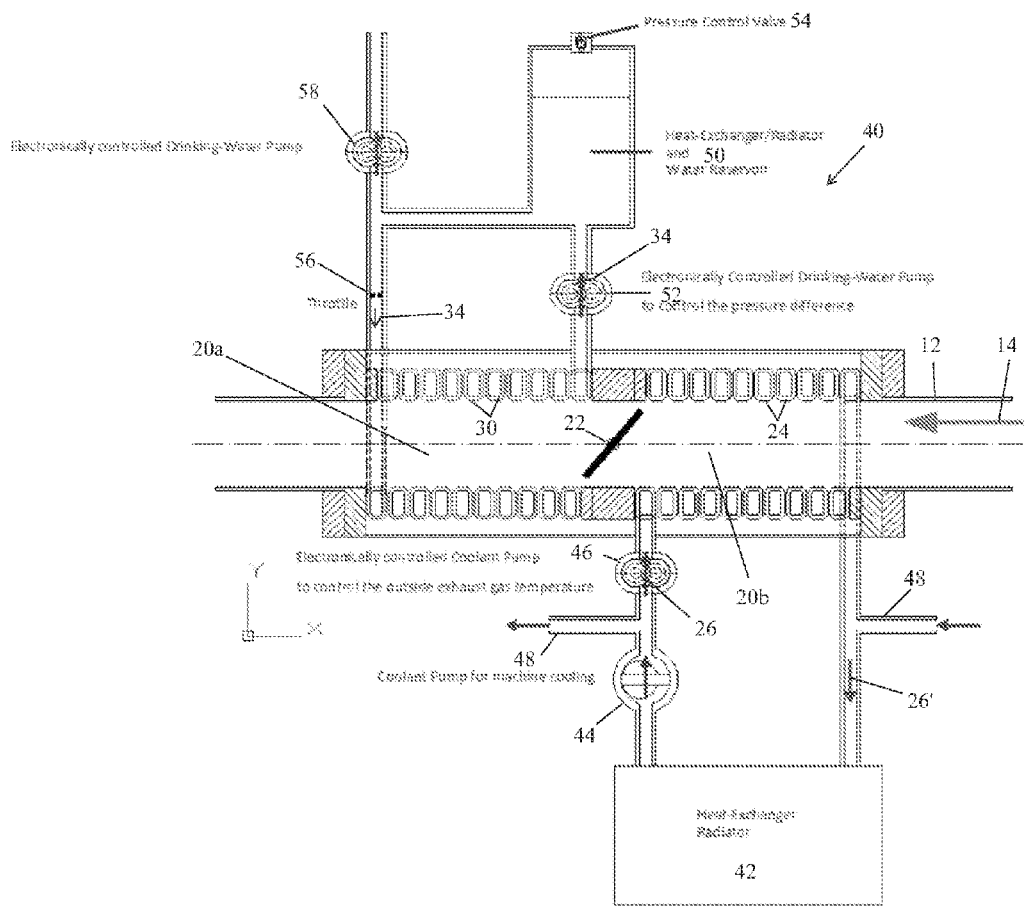
FIG. 2 shows additional features of a drinking water recovery system according to the disclosure.

FIG. 2 shows additional features of a system 40 according to the disclosure for recovering drinking water from exhaust gases. Components of the system 40 common to the system 10 are indicated by their references numbers as described in connection with the system 10. For example, the system 40 includes a heat exchanger radiator 42 to cool the recovered coolant fluid 26' to provide the coolant fluid 26, a pump 44 for circulating the coolant fluid through the radiator 42, and an electronically controlled pump 46 for controlling the flow rate of the coolant fluid 26 through the second chamber 20b to control the exhaust gas temperature. In circumstances in which the output of the pump 46 is less than the output of the pump 44, a portion of the fluid 26 representing the portion not output by the pump 46 is recirculated to the radiator 42 via conduits 48.

The system 40 also includes a recovery tank 50. Water accumulated on the interior of the tubes 30 flows toward the recovery tank 50. Control over the pressure differential to maintain a desired negative pressure to facilitate migration of water collecting on the outer surfaces of the tube 30a to migrate to the interior of the tubes 30 and to travel to the recovery tank 50 is accomplished by use of an electronically controlled pump 52 and pressure control valve 54 and throttle 56. Withdrawal of drinking water from the tank 50 is accomplished by use of an electronically controlled pump 58.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A system for recovering water from exhaust gases, the system comprising:
    an exhaust flow path configured for having exhaust gases flow therethrough at a first velocity and a first temperature;

a valve within the exhaust flow path; and a chamber adjacent to the exhaust flow path providing an enclosed flow area in flow communication with the exhaust flow path, wherein the valve is operable to divert a portion of the exhaust gases from exhaust flow path for travel into the chamber, the chamber having:

a first section into which the diverted exhaust gases expand and slow down to a second velocity that is slower than the first velocity, the first section including cooling surfaces to reduce the temperature of the diverted exhaust gases to a temperature that is less than the first temperature; and a second section in flow communication with the first section for receiving flow of diverted and cooled exhaust gases from the first section, the second section including a plurality of fluid permeable tubes having a porous external coating thereon for contacting the diverted and cooled exhaust gases, wherein the diverted and cooled exhaust gases condense on the tubes to yield liquid water which travels to interior portions of the tubes for recovery to yield recovered water.

2. The system of claim 1, wherein the first section includes spaced apart helical cooling tubes through which is passed a cooling fluid.

3. The system of claim 1, wherein the tubes of the fluid permeable tubes of the second section are spaced apart tubes and the tubes have a fluid permeable sidewall coated on the exterior thereof with a porous material that promotes migration of water from the exterior to the interior of the tubes.

4. The system of claim 1, wherein the recovered water comprises potable water.

5. The system of claim 1, wherein the valve is adjustable and controlled by an electronic controller to restrict or open the exhaust flow path to adjust the amount of gases diverted to the chamber.

6. The system of claim 1, further comprising a pump and a radiator in flow communication with the first section of the chamber and the second section of the chamber, wherein the recovered water is directed to the radiator for cooling and the cooled recovered water is directed to the cooling surfaces.

7. A system for recovering water from exhaust gases, the system comprising:

an exhaust flow path configured for having exhaust gases flow therethrough at a first velocity and a first temperature;

a valve within the exhaust flow path; and a chamber adjacent to the exhaust flow path providing an enclosed flow area in flow communication with the exhaust flow path, wherein the valve is operable to divert a portion of the exhaust gases from exhaust flow path for travel into the chamber, the chamber having:

a first section into which the diverted exhaust gases expand and slow down to a second velocity that is slower than the first velocity, the first section including spaced apart helical cooling tubes through which is passed a cooling fluid to reduce the temperature of the diverted exhaust gases to a temperature that is less than the first temperature; and a second section in flow communication with the first section for receiving flow of diverted and cooled exhaust gases from the first section, the second section including a plurality of tubes having a fluid permeable sidewall coated on the exterior thereof with a porous material that promotes migration of water from the exterior to the interior of the tubes thereon for contacting the diverted and cooled exhaust gases, wherein the diverted and cooled exhaust gases condense on the tubes to yield liquid water which travels through the porous material to interior portions of the tubes for recovery to yield recovered potable water.

\* \* \* \* \*